US008690086B2

(12) United States Patent
Valerio (10) Patent No.: US 8,690,086 B2
(45) Date of Patent: Apr. 8, 2014

(54) METHOD AND SYSTEM FOR SEPARATING AND RECOVERING WIRE AND OTHER METAL FROM PROCESSED RECYCLED MATERIALS

(75) Inventor: Thomas A. Valerio, New Port Richey, FL (US)

(73) Assignee: Thomas A. Valerio, Fort Lauderdale, FL (US)

( * ) Notice: Subject to any disclaimer, the term of this patent is extended or adjusted under 35 U.S.C. 154(b) by 0 days.

(21) Appl. No.: 13/616,948

(22) Filed: Sep. 14, 2012

(65) Prior Publication Data

US 2013/0008832 A1    Jan. 10, 2013

Related U.S. Application Data

(62) Division of application No. 12/848,317, filed on Aug. 2, 2010, now Pat. No. 8,360,347.

(60) Provisional application No. 61/230,464, filed on Jul. 31, 2009.

(51) Int. Cl.
*B02C 23/20*        (2006.01)

(52) U.S. Cl.
USPC ........ 241/19; 209/133; 241/24.14; 241/24.15

(58) Field of Classification Search
USPC ............................................ 241/24.13–24.15
See application file for complete search history.

(56) References Cited

U.S. PATENT DOCUMENTS 3,905,556 A * 9/1975 Drage ............................ 241/19

OTHER PUBLICATIONS

Shen et al., "Ultrapyrolysis of Automobile Shredder Residue," Canadian J. of Chem. Eng'G, vol. 73, 357-66 (1995).
Coulter et al., "Designing for Material Speration: Lessons from Automotive Recycling," Preoceddings of the 1996 ASME Design Engineering Technical Conferences and Computers in Engineering Conference (1996).
Vigano et al., "Material and Energy Recovery from Automobile Shreeded Residues (ASR) via Sequential Gasification and Combustion," Waste Management, vol. 30, 145-53 (2010).

* cited by examiner

*Primary Examiner* — Mark Rosenbaum
(74) *Attorney, Agent, or Firm* — King & Spalding (57) ABSTRACT

Processing waste materials to recover valuable metals, such as copper, from the materials. The disclosed systems and methods employ processes that further refine the waste materials to concentrate the metallic material after the waste materials are initially processed. Processes include employing air separation and screening. Processes also include employing a dynamic sensor and a vacuum pressure separator to separate metals from other materials.

7 Claims, 7 Drawing Sheets

METHOD AND SYSTEM FOR SEPARATING AND RECOVERING WIRE AND OTHER METAL FROM PROCESSED RECYCLED MATERIALS

RELATED APPLICATIONS

This non-provisional patent application is a divisional of U.S. patent application Ser. No. 12/848,317, titled "Method and System for Separating and Recovering Wire and Other Metal from Processed Recycled Materials," filed Aug. 2, 2010, now U.S. Pat. No. 8,360,347 which claims priority under 35 U.S.C. §119 to U.S. Provisional Patent Application No. 61/230,464, titled "Method and System for Separating and Recovering Wire and Other Metal from Processed Recycled Materials," filed Jul. 31, 2009, the complete disclosure of which is hereby fully incorporated herein by reference.

FIELD OF THE INVENTION

This invention relates to systems and methods for recovering copper wire and other metals from recycled materials. More particularly, this invention relates to systems and methods for employing primarily dry processes for further recovering metals, typically after employing initial processes to separate materials in a recycle waste recovering operation.

BACKGROUND OF THE INVENTION

Recycling of waste materials is highly desirable from many viewpoints, not the least of which are financial and ecological. Properly sorted recyclable materials can often be sold for significant revenue. Many of the more valuable recyclable materials do not biodegrade within a short period, and so their recycling significantly reduces the strain on local landfills and ultimately the environment.

Typically, waste streams are composed of a variety of types of waste materials. One such waste stream is generated from the recovery and recycling of automobiles or other large machinery and appliances. For examples, at the end of its useful life, an automobile is shredded. This shredded material is processed to recover ferrous and non-ferrous metals. The remaining materials, referred to as automobile shredder residue (ASR), which may still include ferrous and non-ferrous metals, including copper wire and other recyclable materials, is typically disposed of in a landfill. Recently, efforts have been made to further recover materials, such as non-ferrous metals including copper from copper wiring and plastics. Similar efforts have been made to recover materials from whitegood shredder residue (WSR), which are the waste materials left over after recovering ferrous metals from shredded machinery or large appliances. Other waste streams that have recoverable materials may include electronic components (also known as "e-waste" or "waste electrical and electronic equipment (WEEE)), building components, retrieved landfill material, or other industrial waste streams. However, in many instances, no cost-effective methods are available to effectively sort waste materials that contain diverse materials. This deficiency has been particularly true for non-ferrous materials, and particularly for non-metallic materials, such as non-ferrous metals, including copper wiring. For example, one approach to recycling wiring has been to station a number of laborers along a sorting line, each of whom manually sorts through shredded waste and manually selects the desired recyclables from the sorting line. This approach is not sustainable in most economics since the labor component is too high.

While some aspects of ferrous and non-ferrous recycling has been automated for some time, mainly through the use of magnets, eddy current separators, induction sensors and density separators, these techniques are ineffective for sorting some non-ferrous metals, such as copper wire. Again, labor-intensive manual processing has been employed to recover wiring and other non-ferrous metal materials. Because of the cost of labor, many of these manual processes are conducted in other countries and transporting the materials adds to the cost.

Many processes for identifying and separating materials are know in the art. However, not all processes are efficient for recovering non-ferrous metals and the sequencing of these processes is one factor in developing a cost-effective recovery process. Also, many processes are "wet," that is, they involve using water or other liquid media. Wet processes tend to be less cost effective, in part, because of the extra processing required to manage and dry materials and these processes often produce waste sludge that must be managed. Further, these processes may still provide a waste stream that can be further refined to provide a recovered product that has a high concentration of copper and other valuable metals.

In view of the foregoing, a need exists for cost-effective, efficient methods and systems for recovering materials from a waste stream, such as materials seen in a recycling process, including non-ferrous metals, in a manner that facilitates revenue recovery while also reducing landfill and, preferably using a dry process, where the process results in a high concentration of recovered metals.

SUMMARY OF THE INVENTION

The present invention provides cost-effective, efficient methods and systems for recovering materials from a waste stream, such as materials seen in a recycling process, including non-ferrous metals, in a manner that facilitates revenue recovery while also reducing landfill and, using a dry process that results in a high concentration of recovered metals.

One aspect of the present invention provides a method for processing a waste stream. The method includes the steps of 1) receiving the waste stream including non-ferrous metal; 2) processing the received waste stream with an air separator to separate the waste stream into a light fraction waste stream and a heavy fraction waste stream; and 3) processing the heavy fraction waste stream in a destoner to increase the concentration of non-ferrous metals in the heavy fraction waste stream as compared to the concentration of non-ferrous metal in the waste stream.

Another aspect of the present invention provides a method for processing a waste stream. The method includes the steps of 1) receiving the waste stream including non-ferrous metal components; 2) processing the received waste stream with a first air separator to generate a first heavy fraction waste stream; 3) processing the first heavy fraction waste stream in a first destoner to generate a second heavy fraction and a light fraction; 4) crushing the second heavy fraction in a crusher; 5) screening the crushed second heavy fraction to separate the components of the crushed second heavy fraction into a first size and a second size, wherein the first size is larger than the second size; 6) processing the first size of components of the second heavy fraction in a second destoner to generate a third heavy fraction; and 7) processing the second size of components of the second heavy fraction in a small materials separator to further concentrate the non ferrous metal component in the second size.

Yet another aspect of the present invention provides a method for processing a waste stream. The method includes the steps of 1) receiving the waste stream including non-ferrous metal components; 2) processing the received waste stream with a first air separator to generate a first heavy fraction waste stream and a first light fraction waste stream; 3) processing the first heavy fraction waste stream in a first destoner to generate a second heavy fraction waste stream and a second light fraction waste stream; 4) screening the second heavy fraction waste stream to separate the components of the second heavy fraction waste stream into a first size range and a second size range, wherein the first size range comprises waste components that are larger than the waste components comprising the second size range; and 5) processing the second size range of the second heavy fraction waste stream in a second destoner to generate a third heavy fraction.

Yet another aspect of the present invention provides a system for processing a waste stream. The system includes: a first air separator operable receive the waste stream and to generate a first light fraction and a first heavy fraction of the waste stream wherein the first heavy fraction comprises non-ferrous metal components; a first destoner operable to generate a second light fraction and a second heavy fraction from the first heavy fraction a screen operable to receive the second heavy fraction and separate the second heavy fraction into a first size range and a second size range, wherein the first size range comprises waste stream components having a size greater than the waste stream components comprising the second size range; and a second destoner operable to separate the second heavy fraction comprising the second size range into a third light fraction and a third heavy fraction, wherein the third heavy fraction comprises non-ferrous metal at a concentration greater than the concentration of non-ferrous metal in the waste stream.

DETAILED DESCRIPTION OF THE EXEMPLARY EMBODIMENTS

Exemplary embodiments of the present invention provide systems and methods for recovering non-ferrous metals, such as copper, employing a primarily dry process and in a highly concentrated form.

Figure 1:
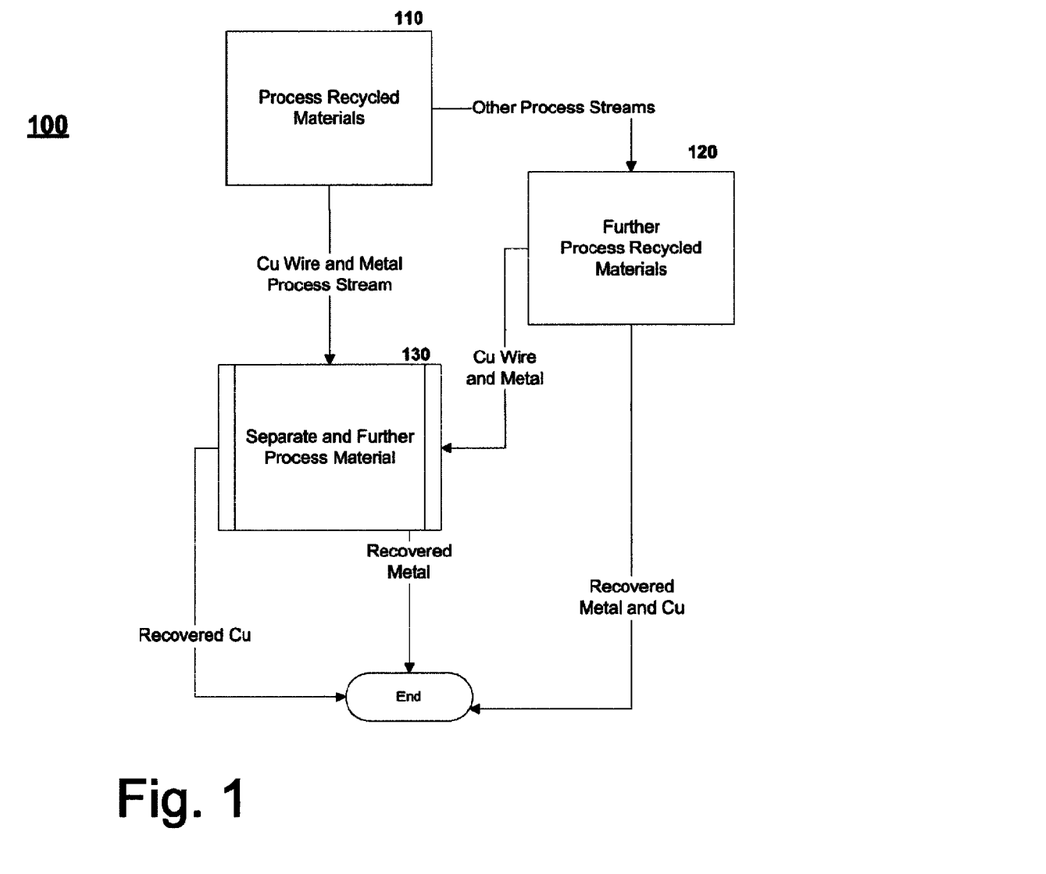
FIG. 1 depicts a process flow diagram for processing recycled materials in accordance with an exemplary embodiment of the present invention.

FIG. 1 depicts a process flow diagram 100 for processing recycled materials in accordance with an exemplary embodiment of the present invention. Referring to FIG. 1, at step 110, recycled material waste streams, or residues, such as ASR, WSR, and WEEE, are processed to separate and concentrate certain recoverable materials from the residues. Any combination of known or later-developed recycling processes can be used to separate and extract these materials. The results of these processes will be material streams that are concentrated in a particular type of material. One such process stream is concentrated in copper and other metals. This stream will typically have copper wire, other non-ferrous metals, and some (typically 4 to 5 percent) ferrous metals. The typical concentration of non-ferrous materials in this stream is 2 to 6 percent. Other process streams may be concentrated in one or more types of plastics or other recoverable materials.

One such system that may be used to generate a process stream of copper and other metals is an eddy current system. An eddy current separator typically includes a rotor featuring on cylinder surface rows of permanent magnet blocks of alternate polarities. The permanent magnet blocks can either be standard ferrite ceramic or the more powerful rare earth magnets. The rotor spins at high revolutions, typically between 1800 rpm and 4000 rpm, to produce a variable magnetic field generating "eddy currents" in the metals crossing it. This eddy current reaction on the different non-ferrous metals is different based on their specific mass, shape, and resistivity, creating a repelling force on the charged particles of the non-ferrous metals and causing the materials to be separated.

Another system that may be used to generate a process stream of copper and other metals is an inductive sensor. An inductive sensor determines the presence of metal based on current produced in an inductive loop. The current from the inductive loop is filtered using two criteria: the amplitude (or magnitude) of the current and the time constant of the current. In other words, for an inductive sensor to indicate that a metallic object is present, the current generated in the inductive loop must reach a specified minimum level (threshold) and remain above that threshold for a specified time interval, called the debounce, before the digital output from the sensor is turned on. This digital output is an indication of the presence of a metallic object in the monitored material. The digital output is then held on until the inductive loop current drops back below the threshold.

Eddy current and inductive sensor systems are two exemplary systems that can be employed, perhaps in conjunction with other processes, to generate a process stream of copper and other metals. Other systems and processes may also be employed to generate a process stream of copper and other metals without deviating from the present invention. That is, the starting point for the present invention is a process stream of copper and other metals.

At step 120, other process streams, including but not limited to a process stream concentrated in recoverable plastic materials, is further processed. This further processing provides additional separation and concentration of the recoverable materials, such as plastics. Although the materials at step 120 do not include concentrates of copper and other metals, these materials still may include copper and other metals in them, as step 110 would not typically concentrate all metallic material into the copper and other metals process stream. For example, some insulated copper wire might be included in a plastics process stream. The further processing of the streams at step 120 may separate additional copper and other metals from these streams. As such, this copper and other metals may be added to the material processed at step 130.

At step 130, the process stream of copper and other metals that results from step 110, plus any copper and other metals resulting from step 120, is further processed. As an initial step, the process stream of copper and other metals is separated into two size categories, typically 0 to 4 millimeters (mm) and 4 mm to 15 mm. For example, a screen with a 4 mm mesh or other method for separating the resulting material into two size ranges can be employed. The further processing of these separated materials is discussed below, in connection with FIGS. 2 and 3. The separation into two size categories, such as 0 to 4 millimeters (mm) and 4 mm to 15 mm, described here is exemplary and other size categories may be used. Also, more than two size categories may be produced. Further, materials that are processed are three dimensional. Typically, the sizes cited herein, e.g., "4 mm" represents the size of a screen mesh that a component of the waste stream can fit through or the width of a slotted screen. Accordingly, one of the dimensions of the component may be larger than 4 mm.

Figure 2:
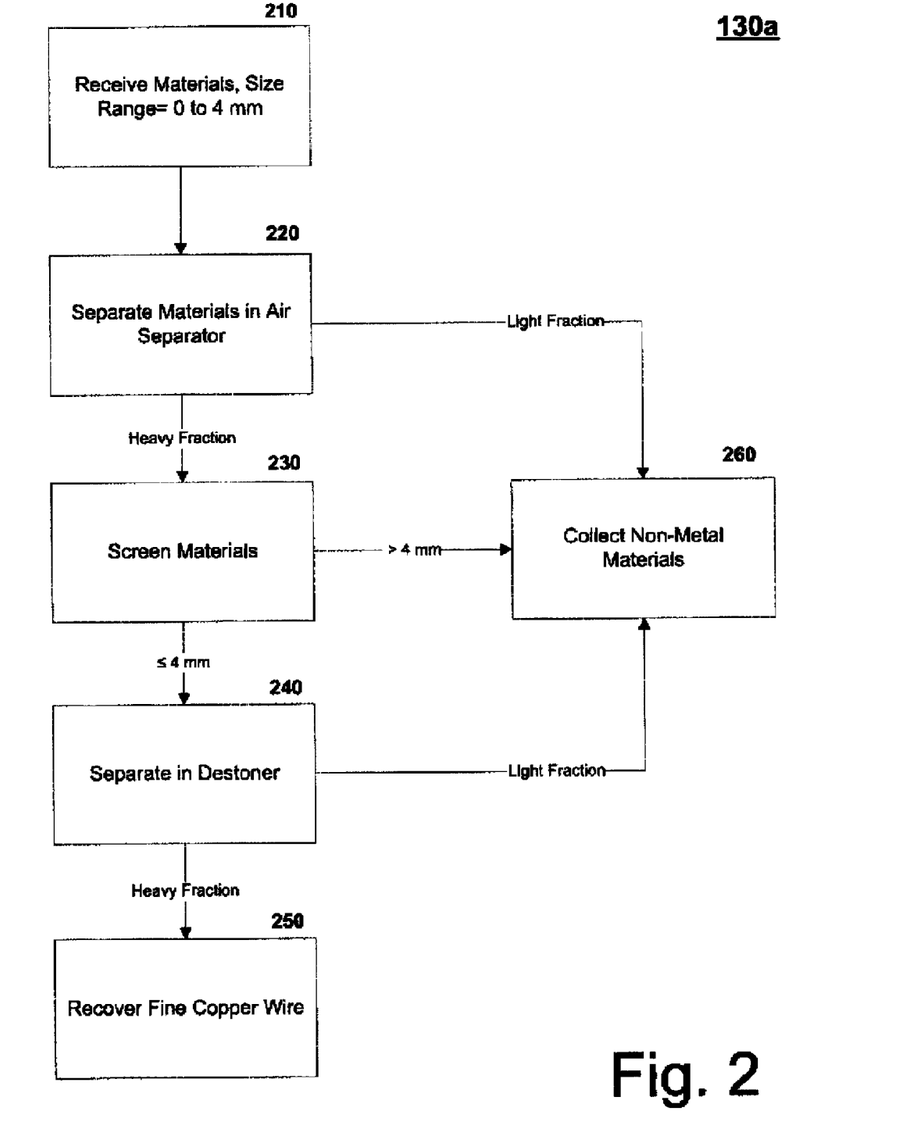
FIG. 2 depicts a process flow diagram for recovering metals having a specific size range (0 mm-4 mm) in accordance with an exemplary embodiment of the present invention.
Figure 4:
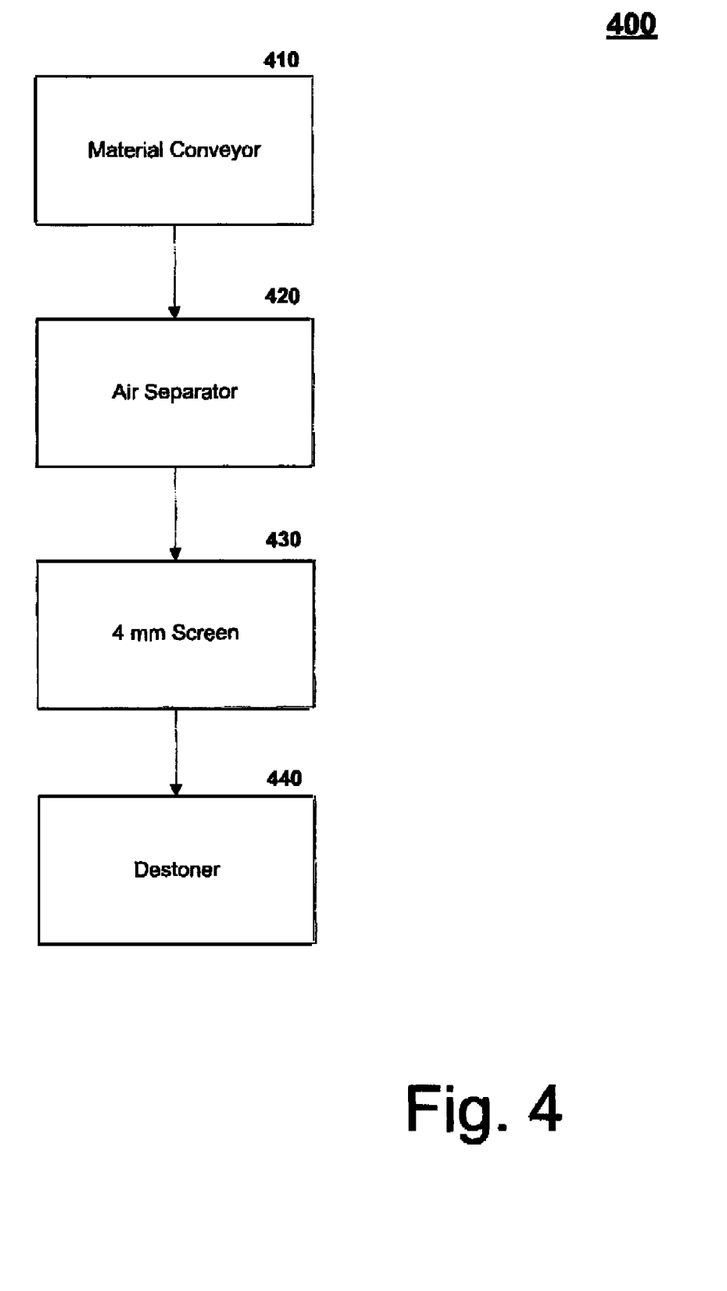
FIG. 4 depicts a system for recovering metals having a specific size range (0 mm-4 mm) in accordance with an exemplary embodiment of the present invention.

FIG. 2 depicts a process flow diagram 130a for recovering metals having a specific size range (0 mm-4 mm) in accordance with an exemplary embodiment of the present invention. FIG. 4 depicts a system for recovering metals having a specific size range (0 mm-4 mm) in accordance with an exemplary embodiment of the present invention. Referring to FIGS. 2 and 4, at step 210, the process 130a receives material with a size range of typically 0 to 4 mm. This material may be received on a material conveyor 410. The material conveyor 410 may be one or more of the following: conveyor belts, slides, chutes, screw conveyors, augers, and the like. The received material primarily includes non-ferrous metals but may also include some ferrous metals and other materials.

At step 220, the received material is further separated using an air separator 420. One possible air separator that may be used is a Zig-a-Flo Aspirator, manufactured by Forsberg, Inc. Another such air separator is described in U.S. patent application Ser. No. 12/769,525, entitled "Apparatus and Method for Separating Materials Using Air, which is hereby incorporated by reference herein in its entirety. Other air separators may be used. This air separation step results in two separated process streams. The light fraction stream will have dust and other materials that are not of value to recover. As such, the light fraction is not further processed, but is instead collected at step 260. This collected material is likely discarded.

The heavy fraction stream contains metals to be recovered. At step 230, the heavy fraction from the air separation step 220 is screened, such as by a screen 430 with a 4 mm mesh. The screening process separates the heavy fraction by size. Typically, material that is smaller than 4 mm passes through the screen 430 while larger material is captured in the screen 430. The fraction retained in the screen 430, that is, the fraction larger that 4 mm, is not further processed in process 130a, but is instead collected at step 260. This collected material may be further processed (for example, this collected material may be processed in accordance with process 130b, discussed below in conjunction with FIG. 3). Step 230 is optional and may be omitted, as the material received at step 210 is already segregated into the 0 to 4 mm size range. However, this step 230 may be necessary if the initial segregation process, that is, the segregation prior to step 210, allowed materials greater than 4 mm to enter the process stream.

The fraction from the screening step 230 that passes through the screen 430, or, if step 230 is omitted, the heavy fraction from the air separation step 220, is then processed in a destoner 440, also referred to as a vacuum pressure separator, at step 240. A destoner separates dry, granular materials into two specific weight fractions—a heavy fraction and a light fraction. Typically, a destoner includes a screen on a deck. Material is vibrated on the deck as air moves up through the screen. The light fraction is entrained in the air stream while the heavy fraction is not. A typical destoner is the Forsberg P-Series Destoner, made by Forsberg, Inc.

The light fraction separated by the destoner 440 would typically include dirt, rocks, glass, plastic, rubber, and other materials with a density of less than approximately 2.8 grams per cubic centimeter. These materials are not worth recovering and, as such, this light fraction is not further processed, but is instead collected at step 260. The heavy fraction separated by the destoner 440 contains concentrated copper in the form of fine copper wire. This material is collected at step 250 and the process 130a ends.

Figure 3:
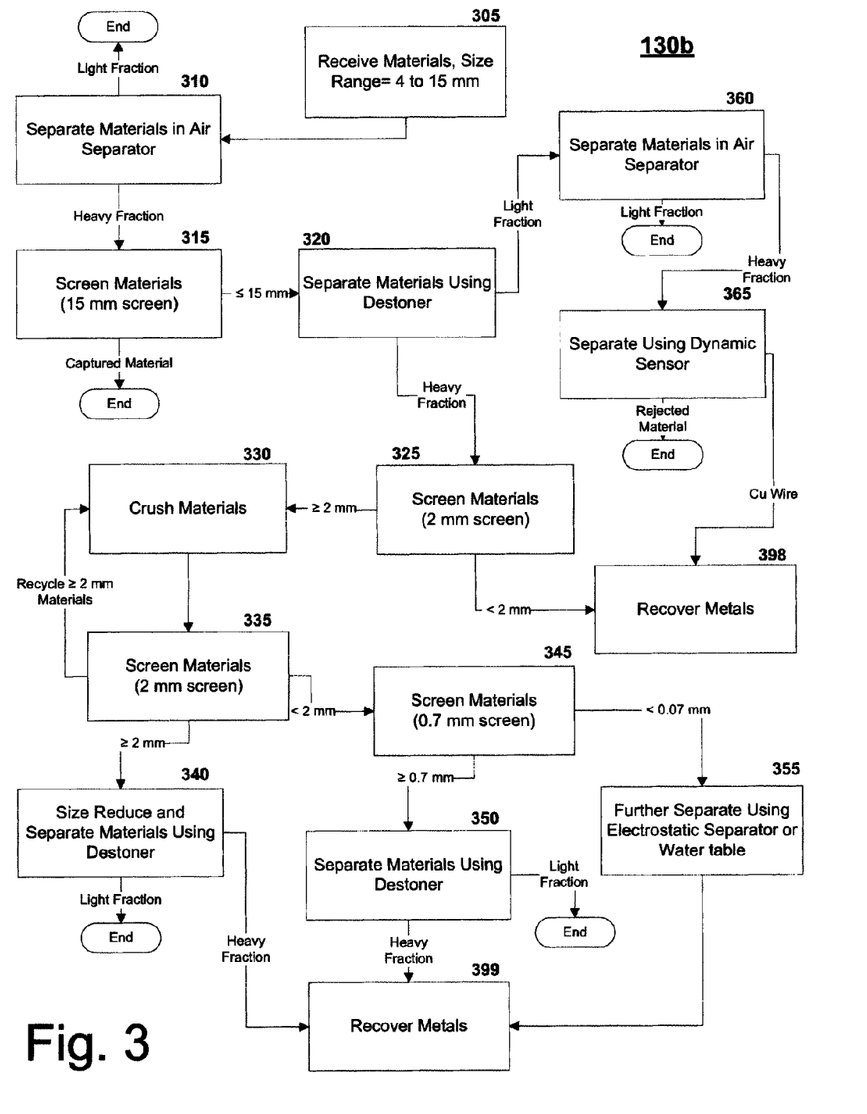
FIG. 3 depicts a process flow diagram for recovering non-ferrous metals having a specific size range (4 mm-15 mm) in accordance with an exemplary embodiment of the present invention.
Figure 5:
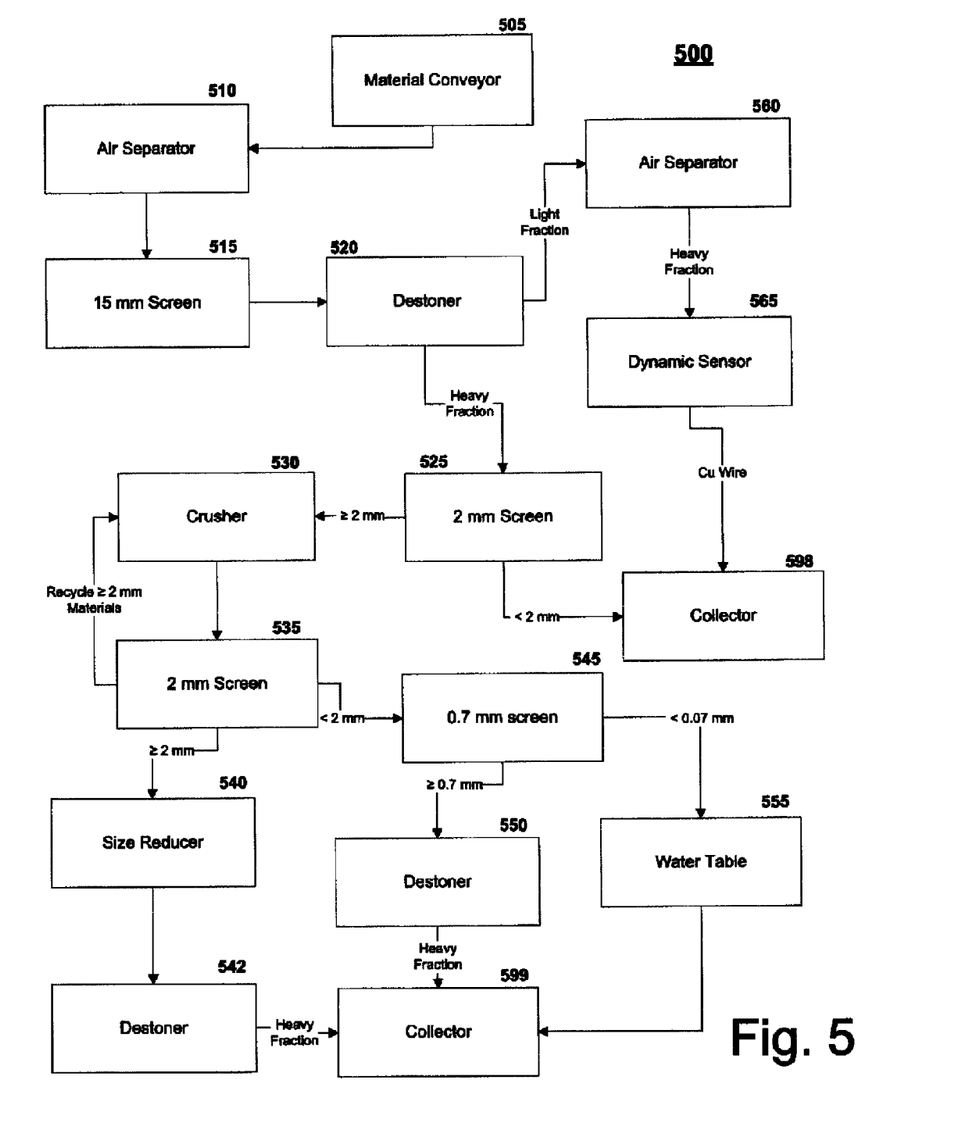
FIG. 5 depicts a system for recovering non-ferrous metals having a specific size range (4 mm-15 mm) in accordance with an exemplary embodiment of the present invention.

FIG. 3 depicts a process flow 130b for recovering metals having a specific size range (4 mm-15 mm) in accordance with an exemplary embodiment of the present invention. FIG. 5 depicts a system for recovering non-ferrous metals having a specific size range (4 mm-15 mm) in accordance with an exemplary embodiment of the present invention. Referring to FIGS. 3 and 5, at step 305, the process 130b receives a process stream of copper and other metals with a size range of typically 4 mm to 15 mm, such as by a material conveyor 505. This material primarily includes non-ferrous metals but may also include ferrous metals and other materials. Although this stream has been segregated to include primarily materials in the size range of 4 mm to 15 mm, smaller and larger sized materials may be present in the waste stream. The material conveyor 505 may be one or more of the following: conveyor belts, slides, chutes, screw conveyors, augers, and the like.

At step 310, the process stream of copper and other metals is separated using an air separator 510. One possible air separator that may be used is a Zig-a-Flo Aspirator, manufactured by Forsberg, Inc. Another such air separator is described in U.S. patent application Ser. No. 12/769,525, entitled "Apparatus and Method for Separating Materials Using Air, which is hereby incorporated by reference herein in its entirety. Other air separators may be used. This air separation step results in two separated waste streams. The light fraction will have materials that are not of value to recover. As such, the light fraction is not further processed with process 130b, but is instead collected. This collected material is likely discarded but may be further processed to recover valuable material (further processing steps not shown).

At step 315, the heavy fraction from the air separation step 320 is screened, using a 15 mm mesh screen 515. Material greater than 15 mm in size is captured in the screen 515. The captured material is not further processed with process 130b, but is instead collected. This collected material may be further processed (further processing steps not shown). Step 315 is optional and may be omitted, as the material received at step 210 is already segregated into a 4 mm to 15 mm size range, that is, the material is less than or equal to 15 mm. However, this step 315 may be necessary if the initial segregation process, that is, the segregation prior to step 305, allowed materials greater than 15 mm to enter the process stream.

The material in the 4 mm to 15 mm size range, that is, the material that passed through the screen 515, is further processed at step 320. At step 320, the material is separated into a light fraction and heavy fraction using a destoner 520, also referred to as a vacuum pressure separator. The light fraction from the destoner 520 will typically include non-metals but may include some insulated wire. The further processing of this light fraction is discussed below, in connection with steps 360 and 365.

The heavy fraction from step 320 is further processed at step 325. At step 325, the heavy fraction stream is screened to separate the material according to size. For example, a screen 525 with a 2 mm mesh size is used. Accordingly, material less than 2 mm in size passes through the screen 525 and is recovered, such as in collector 598 at step 398. This material is primarily fine copper wire that was entrained with the 4 mm to 15 mm material prior to receiving the material at step 305.

The material captured in the screen 525, that is, material 2 mm in size and greater, is further processed at step 330. At step 330, the material is crushed, such as in a crusher 530. A typical crusher that may be used is a vertical shaft impact (VSI) crusher. An exemplary crusher is the Turbo 54 VSI Crusher, manufactured by Cemco, Inc.

The crushed material is screened at step 335, using a 2 mm mesh screen 535. Material that is caught in the screen 535, which would typically be material greater than or equal to 2 mm in size, contains copper and other metals. This material is recycled back to the crusher 530 at step 330. This recycling process may be performed at least two times. That is, after the material is recycled through step 330, it is again screened at step 335. Material captured in the screen 535 at step 335 is again sent to the crusher 530 at step 330. Material that is captured a third time in the screen 535 at step 335 may not be further recycled but instead processed at step 340, described below. Given this recycling process through the crusher 530, the process 130b is conducted batch-wise, at least for step 330 and subsequent steps. In an alternative embodiment, this recycling process may be omitted. By omitting this recycling process, the process 130b may be more continuous.

Material that passes through the screen 535 at step 335, that is, material typically smaller than 2 mm in size, is further processed at step 345, discussed below.

At step 340, the material that is greater than or equal to 2 mm in size is size reduced to a size of at least 5 mm through a chopping or grinding process in a size reducer 540. Any known type of size reducer, such as a grinder, ring mill, hammermill, and the like, may be used. The material is then separated using a destoner 542. The destoner 542 may be identical to the destoner 520. The light fraction from the destoner 542 will have materials that are not of value to recover, typically non-metallic materials. As such, the light fraction is not further processed with process 130b, but is instead collected. This collected material is likely discarded. The heavy fraction from the destoner 542 is collected in a collector 599 at step 399.

At step 345, the material that passes through the screen at step 335 is further processed by an additional screen 545 with a 0.7 mm mesh. At step 350, the material that was captured by the screen 545 at step 345, that is, material greater than or equal to 0.7 mm in size, is further processed by a destoner 550. The destoner 550 may be identical to the destoner 520 and/or the destoner 542. The light fraction from the destoner 550 will have materials that are not of value to recover, typically non-metallic materials. As such, the light fraction is not further processed with process 130b, but is instead collected. This collected material is likely discarded. The heavy fraction from the destoner 550 would include copper and other metals and would be collected at step 399.

At step 355, the material that passed through the screen 545 at step 345, that is, material less than 0.7 mm in size, is further processed by a electrostatic separator (not shown) or water separation table 555. An electrostatic separator uses charged electrodes to separate materials of differing electrostatic charges. Any metals in the material processed at step 355 would be separated from other, non-metallic materials. The metals would be collected at step 399.

Similarly, a water separation table is a flowing film concentrator. Flowing film concentrators have a thin layer of water flowing across them, where these layers of water include entrained solid materials, materials with different densities. A pattern of raised ridges (riffles) across the length of the table causes the higher density particles to stay behind the ridge, since they are closest to the bottom of the flowing water film. These particles, which would include the copper wire pieces and other metal, follow the ridge down the slope to the metal discharge point. Since the water is flowing perpendicular to the ridges or riffles of the table, the low specific gravity material will be washed over the top of the ridges and off the tailings discharge side of the table. In this way, the copper or other metal is separated from non-metal materials. The metals would be collected at step 399.

The metal collected at either step 398 or step 399 would contain high concentrations of copper and other metals. That is, the resulting product would have low concentrations of debris and other materials of non-value. The metal collection aspect of process 130b has been illustrated as two separate steps, step 398 and step 399, for convenience of illustrating the process. As can be recognized from FIG. 3 and the description above, metal material is collected at a number of points in the process 130b following specific process steps, such as process steps 340, 350, 355, and 365 and the process does not actual have two discrete metal collection steps.

As discussed above, the light fraction generated from the destoner 520 at step 320 is further processed at step 360. At step 360, this light fraction of material is separated using an air separator 560. The air separator 560 may be identical to the air separator 510. The heavy fraction from the air separator step 360 is processed by a dynamic sensor 565 at step 365. A dynamic sensor differs from an inductive sensor. A dynamic sensor measures the rate of change of the amount of current produced in an inductive loop and detects the presence of metallic objects based on this rate of change. A key difference between a dynamic sensor and a standard inductive sensor is the way the detector filters and interprets the analog current level generated in the inductive loop. In an alternative embodiment, an inductive sensor (not shown) can be used instead of the dynamic sensor. Certain exemplary dynamic sensors are described in more detail in U.S. Pat. No. 7,732,726, entitled "System and Method for Sorting Dissimilar Materials Using a Dynamic Sensor," issued Jun. 8, 2010, the entire content of which is hereby fully incorporated herein by reference. The metal objects identified by the dynamic sensor would be collected at step 398. This collection step may include the dynamic sensor actuating an air jet to direct the copper wire material into the collector 598 based on the dynamic sensor 565 identifying the copper wire material. For example, the copper wire material may be moving along a conveyor belt past the detectors that make up the dynamic sensor 565. Upon the dynamic sensor 565 identifying a location on the conveyor belt of copper wire material, the copper wire is directed, such as by an air jet, to the collector 598 when the material reaches the end of the conveyor belt.

Alternatively, the material identified in step 365, which will likely include insulated wire, can be mixed with the material captured in the screen 535 at step 335 and further processed at step 340. In other words, in this alternative embodiment, the material identified at step 365 would be size reduced and separated with a destoner 542 at step 340.

Figure 6:
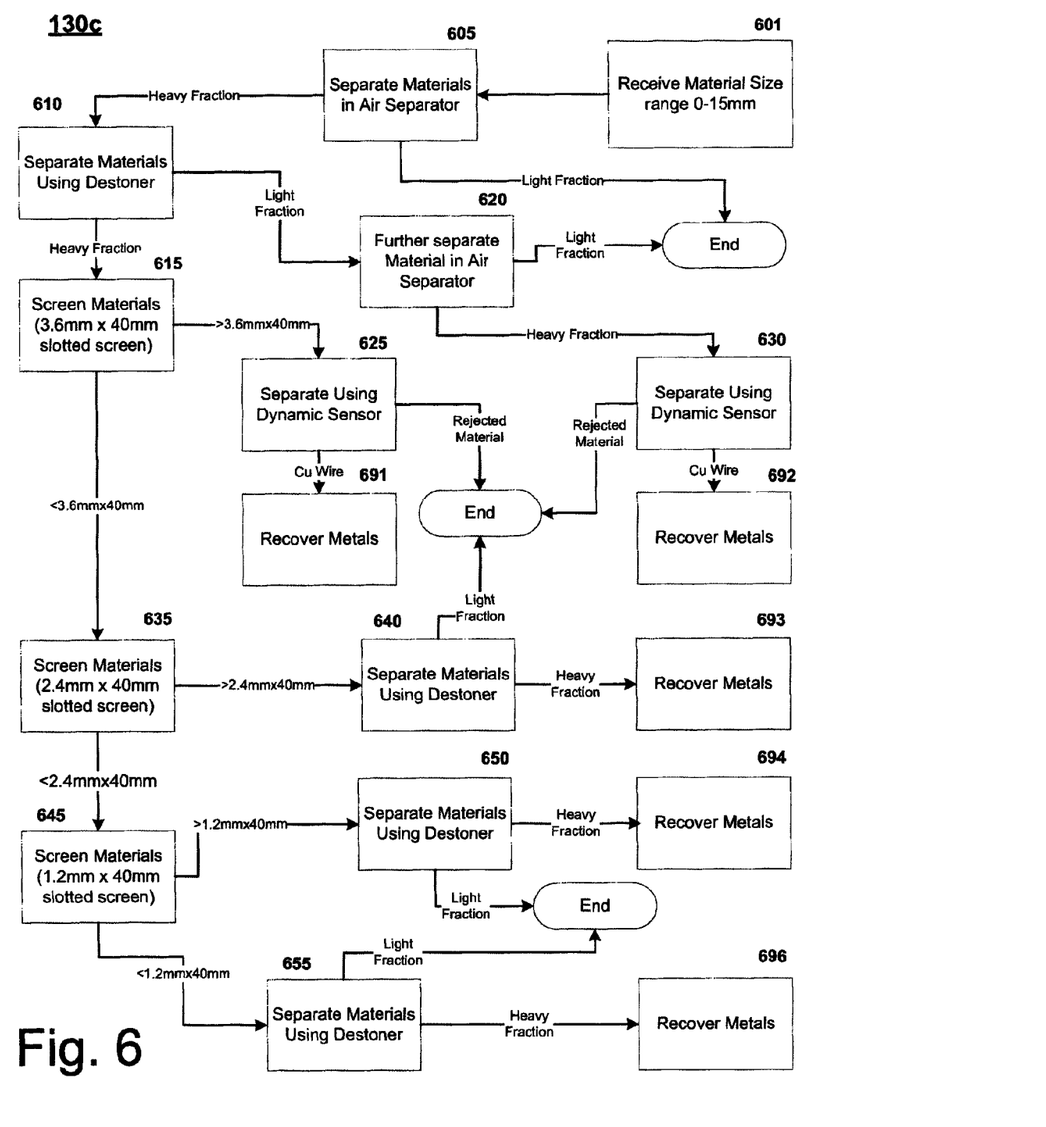
FIG. 6 depicts a system for recovering metals in accordance with an exemplary embodiment of the present invention.
Figure 7:
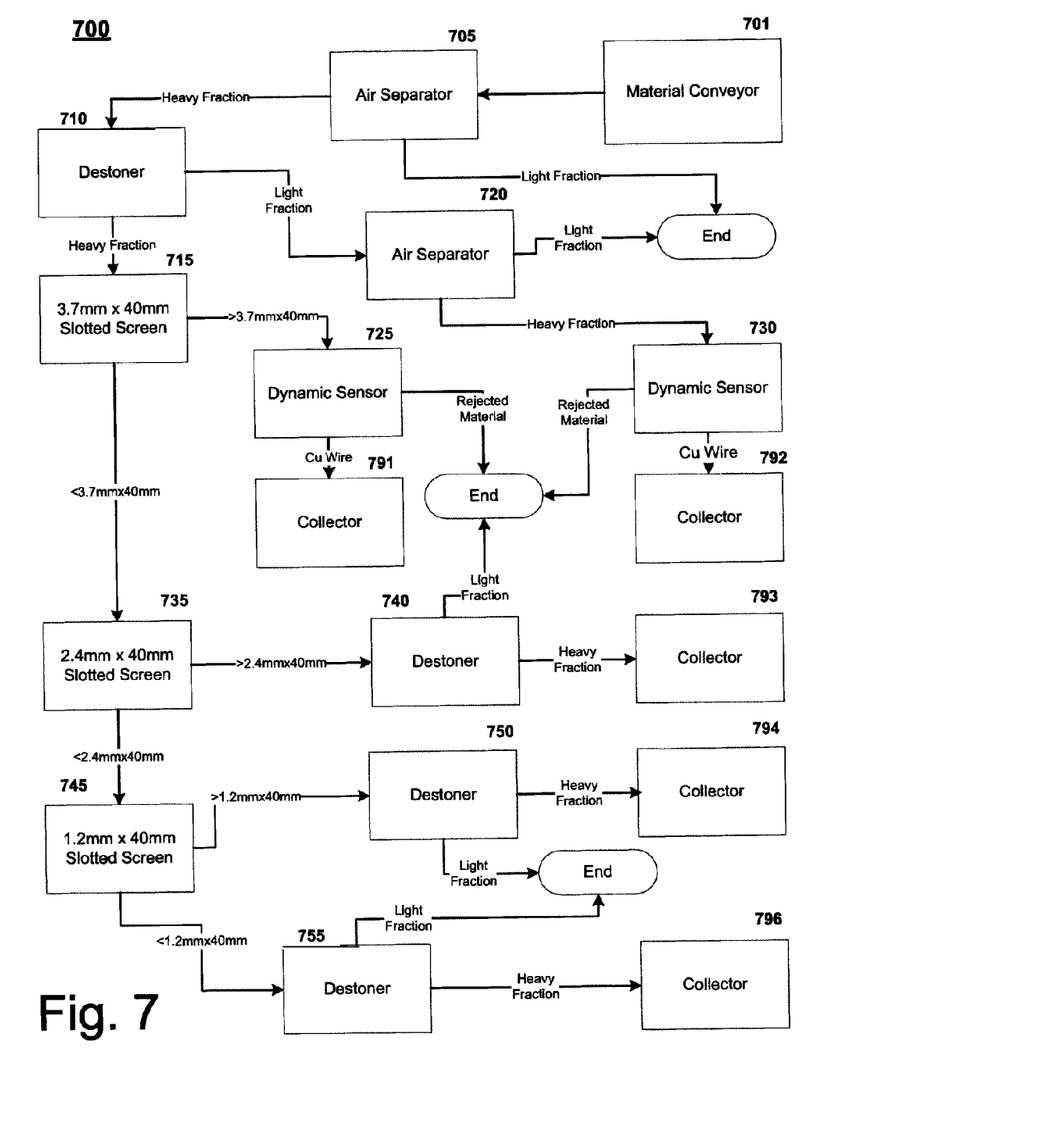
FIG. 7 depicts a system for recovering non-ferrous metals in accordance with an exemplary embodiment of the present invention.

FIG. 6 depicts a process flow diagram 130c for recovering metals in accordance with an alternative exemplary embodiment of the present invention. FIG. 7 depicts a system 700 for recovering non-ferrous metals in accordance with this alternative exemplary embodiment of the present invention. As can be seen in these figures, this alternative embodiment does not employ a crusher. The use of a crusher may be undesirable because of the dust generated by the crusher. Referring to FIGS. 6 and 7, at step 601, the process 130*c* receives a process stream of copper and other metals with a size range of typically 0 mm to 15 mm, such as by a material conveyor 701. This material primarily includes non-ferrous metals but may also include ferrous metals and other materials. Although this stream has been segregated to include primarily materials in the size range of 0 mm to 15 mm, larger sized materials may be present in the waste stream. The material conveyor 701 may be one or more of the following: conveyor belts, slides, chutes, screw conveyors, augers, and the like.

At step 605, the process stream of copper and other metals is separated using an air separator 705. One possible air separator that may be used is a Zig-a-Flo Aspirator, manufactured by Forsberg, Inc. Another such air separator is described in U.S. patent application Ser. No. 12/769,525, entitled "Apparatus and Method for Separating Materials Using Air, which is hereby incorporated by reference herein in its entirety. Other air separators may be used. This air separation step results in two separated waste streams. The light fraction will have materials that are not of value to recover. As such, the light fraction is not further processed with process 130*c*, but is instead collected. This collected material is likely discarded but may be further processed to recover valuable material (further processing steps not shown).

At step 610, the heavy fraction from the air separation step 605 is further processed. The material is separated into a light fraction and heavy fraction using a destoner 710, also referred to as a vacuum pressure separator. The light fraction from the destoner 710 will typically include non-metals but may include some insulated wire. The further processing of this light fraction is discussed below, in connection with steps 620 and 630.

The heavy fraction from step 610 is further processed at step 615. The heavy fraction stream is screened to separate the material according to size using screen 715. The exemplary screen 715 is a slotted screen with slots measuring 3.6 millimeters by 40 millimeters. Material that is caught in the screen 715, that is, material that did not fall through the 3.6 mm×40 mm slots, is further processed at step 625, which is described below.

At step 635, the material that passed through the screen 715 is further screened using a screen 735. The exemplary screen 735 is a slotted screen with slots measuring 2.4 millimeters by 40 millimeters. Material that is caught in the screen 735, that is, material that did not fall through the 2.4 mm×40 mm slots, is further processed at step 640, which is described below.

At step 645, the material that passed through the screen 735 is further screened using a screen 745. The exemplary screen 745 s a slotted screen with slots measuring 1.2 millimeters by 40 millimeters. Material that is caught in the screen 745, that is, material that did not fall through the 1.2 mm×40 mm slots, is further processed at step 650, which is described below.

At step 655, the material that passed through the screen 645 is separated into a light fraction and a heavy fraction using a destoner 755. The light fraction from the destoner 755 typically would not include any material of value to recover. This light fraction would likely be discarded. The heavy fraction from the destoner 755 includes concentrated non-ferrous metals, which are recovered at step 696 in a collector 796, such as a bin.

Similarly, at step 640, the material that failed to pass through the screen 635 is separated into a light fraction and a heavy fraction using a destoner 740. The light fraction from the destoner 740 typically would not include any material of value to recover. This light fraction would likely be discarded. The heavy fraction from the destoner 740 includes concentrated non-ferrous metals, which are recovered at step 693 in a collector 793, such as a bin. Similarly, at step 650, the material that failed to pass through the screen 645 is separated into a light fraction and a heavy fraction using a destoner 750. The light fraction from the destoner 750 typically would not include any material of value to recover. This light fraction would likely be discarded. The heavy fraction from the destoner 750 includes concentrated non-ferrous metals, which are recovered at step 694 in a collector 794, such as a bin.

Destoners 710, 740, 750, and 755 have been described as separate pieces of equipment in this exemplary embodiment. Alternative embodiments can employ less than four separate destoners to perform the process 130*c*. In that alternative, a single destoner may perform more than one of the steps 610, 640, 650, 655. Similarly, the function of collectors 693, 694, and 696 may be performed by less than three collectors.

At step 620, the light fraction generated by the destoner 710 at step 610 is further processed in an air separator 720. One possible air separator that may be used is a Zig-a-Flo Aspirator, manufactured by Forsberg, Inc. Another such air separator is described in U.S. patent application Ser. No. 12/769,525, entitled "Apparatus and Method for Separating Materials Using Air, which is hereby incorporated by reference herein in its entirety. Other air separators may be used. This air separation step results in two separated waste streams. The light fraction will have materials that are not of value to recover. As such, the light fraction is not further processed with process 130*c*, but is instead collected. This collected material is likely discarded but may be further processed to recover valuable material (further processing steps not shown).

At step 630, the heavy fraction generated at step 620 is processed using a dynamic sensor 730 to identify copper wire in the heavy fraction. Identified copper wire is collected at step 692 in collector 792, such as a bin. This collection step may include the dynamic sensor actuating an air jet to direct the copper wire material into the collector 792 based on the dynamic sensor 730 identifying the copper wire material. For example, the copper wire material may be moving along a conveyor belt past the detectors that make up the dynamic sensor 730. Upon the dynamic sensor 730 identifying a location on the conveyor belt of copper wire material, the copper wire is directed, such as by an air jet, to the collector 792 when the material reaches the end of the conveyor belt.

Similarly, at step 625, the material that failed to pass through the screen 615 is processed using a dynamic sensor 725 to identify copper wire in the heavy fraction. Identified copper wire is collected at step 691 in collector 791, such as a bin. This collection step may include the dynamic sensor actuating an air jet to direct the copper wire material into the collector 791 based on the dynamic sensor 725 identifying the copper wire material. For example, the copper wire material may be moving along a conveyor belt past the detectors that make up the dynamic sensor 725. Upon the dynamic sensor 725 identifying a location on the conveyor belt of copper wire material, the copper wire is directed, such as by an air jet, to the collector 791 when the material reaches the end of the conveyor belt. In an alternative embodiment, the functions of the dynamic sensor 725 and dynamic sensor 730 could be performed by a single dynamic sensor.

One of ordinary skill in the art would appreciate that the present invention provides systems and methods for processing waste materials to recover valuable metals, such as copper, from the materials. The systems and methods employ processes that further refine the waste materials to concentrate the metallic material after the waste materials are initially processed. Processes include employing air separation and screening. Processes also include employing a dynamic sensor and a vacuum pressure separator to separate metals from other materials.

Although specific embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

What is claimed:

1. A method for processing a waste stream comprising the steps of:
    receiving the waste stream consisting of one or more of automobile shredder residue or whitegood shredder residue, and comprising non-ferrous metal;
    processing the received waste stream with an air separator to separate the waste stream into a light fraction waste stream and a heavy fraction waste stream; and
    processing the heavy fraction waste stream in a destoner to increase the concentration of non-ferrous metals in the heavy fraction waste stream as compared to the concentration of non-ferrous metal in the waste stream;
    wherein automobile shredder residue is the waste stream left over after recovering most of the ferrous and non-ferrous metals from shredded automobiles and whitegood shredder residue is the waste stream left over after recovering most of the ferrous and non-ferrous metals from shredded machinery or large appliances and wherein the concentration of non-ferrous metals in automobile shredder residue or whitegood shredder residue is less than the concentration of other components in the automobile shredder residue or whitegood shredder residue.

2. The method of claim 1 further comprising the step of screening the heavy fraction waste stream prior to processing the heavy fraction waste stream in the destoner to separate the heavy fraction into a first size and a second size.

3. The method of claim 2 wherein the first size comprises material that is not further processed in the destoner.

4. The method of claim 1 wherein the non-ferrous metal comprises copper.

5. The method of claim 1 wherein the waste stream comprises automobile shredder residue.

6. The method of claim 1 wherein the waste stream consists of automobile shredder residue only.

7. The method of claim 1 wherein the waste stream consists of whitegood shredder residue only.

* * * * *